(12) United States Patent
Welsh et al.

(10) Patent No.: US 9,602,627 B2
(45) Date of Patent: Mar. 21, 2017

(54) TECHNIQUE FOR SETTING NETWORK COMMUNICATION PARAMETERS

(75) Inventors: John Michael Welsh, Manor, TX (US); Christopher Huybregts, Austin, TX (US); Ben Menchaca, Pflugerville, TX (US)

(73) Assignee: QUALCOMM Incorporated, San Diego, CA (US)

( * ) Notice: Subject to any disclaimer, the term of this patent is extended or adjusted under 35 U.S.C. 154(b) by 173 days.

(21) Appl. No.: 12/825,506

(22) Filed: Jun. 29, 2010

(65) Prior Publication Data

US 2010/0333028 A1    Dec. 30, 2010

Related U.S. Application Data

(60) Provisional application No. 61/221,147, filed on Jun. 29, 2009.

(51) Int. Cl.
  *H04L 29/08*   (2006.01)
  *G06F 3/0484*  (2013.01)

(52) U.S. Cl.
  CPC ........ *H04L 67/322* (2013.01); *G06F 3/04847* (2013.01)

(58) Field of Classification Search
  CPC .......................... G06F 3/04847; H04L 67/322
  USPC ........... 715/833; 709/232, 223–226; 718/104
  See application file for complete search history.

(56) References Cited

U.S. PATENT DOCUMENTS

| | | | |
|---|---|---|---|
| 5,983,261 A * | 11/1999 | Riddle | 709/204 |
| 6,067,557 A * | 5/2000 | Hegde | 718/103 |
| 6,292,838 B1 * | 9/2001 | Nelson | 709/236 |
| 6,574,195 B2 | 6/2003 | Roberts | |
| 6,836,483 B1 | 12/2004 | Lee | |
| 6,957,071 B1 | 10/2005 | Holur et al. | |
| 7,096,260 B1 * | 8/2006 | Zavalkovsky et al. | 709/223 |
| 7,145,871 B2 * | 12/2006 | Levy et al. | 370/229 |

(Continued)

FOREIGN PATENT DOCUMENTS

| | | |
|---|---|---|
| CN | 1620036 A | 5/2005 |
| JP | 2004260386 | 9/2004 |

(Continued)

OTHER PUBLICATIONS

Ruffini, Marco. WO 2007/034387A2; Method for Communicating Between a Plurality of Nodes Using a Wireless Communication Protocol, Inter-Vehicle Networ; Mar. 29, 2007; pp. 1-20.*

(Continued)

*Primary Examiner* — Jennifer To
*Assistant Examiner* — Ashley Fortino
(74) *Attorney, Agent, or Firm* — DeLizio Law, PLLC

(57) ABSTRACT

Techniques are disclosed for providing a bandwidth control interface that displays the relative amount of bandwidth assigned to each application executing at a computer device. By displaying the relative amount of bandwidth, the interface allows the user to easily determine how the available bandwidth is allocated among the applications, and whether the allocation provides for efficient network communication. The bandwidth control interface also allows the user to adjust the relative allocation of bandwidth to the executing applications. The user can thereby control the relative amount of bandwidth that is allocated to each application by a network interface device.

32 Claims, 5 Drawing Sheets

(56) References Cited

U.S. PATENT DOCUMENTS

| | | | |
|---|---|---|---|
| 7,519,916 B1* | 4/2009 | Hartwell et al. | 715/771 |
| 7,843,832 B2* | 11/2010 | Choi et al. | 370/235.1 |
| 7,990,978 B1* | 8/2011 | Chamas et al. | 370/395.21 |
| 2002/0110084 A1 | 8/2002 | Butt et al. | |
| 2002/0118649 A1 | 8/2002 | Farley et al. | |
| 2002/0198924 A1 | 12/2002 | Akashi et al. | |
| 2003/0028626 A1 | 2/2003 | Hennessey et al. | |
| 2004/0042410 A1 | 3/2004 | Harris et al. | |
| 2004/0165574 A1 | 8/2004 | Kakumaru et al. | |
| 2005/0025176 A1 | 2/2005 | Ko et al. | |
| 2006/0039354 A1 | 2/2006 | Rao et al. | |
| 2006/0153127 A1* | 7/2006 | Lee | 370/329 |
| 2006/0168081 A1 | 7/2006 | Okada | |
| 2008/0002714 A1* | 1/2008 | Belgaied et al. | 370/395.21 |
| 2008/0043638 A1 | 2/2008 | Ribiere et al. | |
| 2009/0012821 A1* | 1/2009 | Besson et al. | 705/3 |
| 2009/0198766 A1* | 8/2009 | Chen et al. | 709/202 |
| 2010/0031157 A1* | 2/2010 | Neer et al. | 715/738 |
| 2010/0121964 A1 | 5/2010 | Rowles et al. | |
| 2010/0177673 A1 | 7/2010 | Yoon | |
| 2010/0268834 A1* | 10/2010 | Eidelman et al. | 709/230 |
| 2010/0332667 A1 | 12/2010 | Menchaca et al. | |
| 2012/0036513 A1* | 2/2012 | Choong | H04L 41/0896 718/104 |

FOREIGN PATENT DOCUMENTS

| | | |
|---|---|---|
| JP | 2006135486 | 5/2006 |
| JP | 2006135759 | 5/2006 |
| JP | 2008507928 | 3/2008 |
| KR | 100438713 | 7/2004 |
| KR | 100649297 B1 | 11/2006 |
| KR | 100825507 B1 | 4/2008 |
| KR | 20090042644 | 4/2009 |
| KR | 101346549 | 12/2013 |
| WO | 2006012610 A2 | 2/2006 |

OTHER PUBLICATIONS

QoS: Percentage-Based Shaping, Cisco Systems, Dec. 5, 2006, pp. 3, 13, 18-19.*
Ramani et al., "SyncScan: practical fast handoff for 802.11 infrastructure networks", Mar. 2005, INFOCOM 2005, IEEE, 10 pages.
Written Opinion—PCT/US2010/040298, International Search Authority, European Patent Office, Jan. 28, 2011, 7 pages.
U.S. Appl. No. 12/825,501 Office Action, Apr. 19, 2012, 22 pages.
"KR Application No. 10-2012-7002291 Notice of Preliminary Rejection", May 28, 2013 , 7 pages.
"Japanese Application No. 2012-517842 Office Action", May 21, 2013 , 3 pages.
U.S. Appl. No. 12/825,501 Final Office Action, dated Oct. 23, 2012, 23 pages.
"Chinese Application No. 201080030287.2, First Office Action issued by SIPO", Jan. 3, 2014 , 13 pages.
"Chinese Application No. 201080030287.2, Second Office Action issued by SIPO", Jun. 5, 2014, 6 pages.
"European Search Report, European Patent Office, European Patent Application No. 10800282.5", Nov. 30, 2016, 8 pages.

* cited by examiner

TECHNIQUE FOR SETTING NETWORK COMMUNICATION PARAMETERS

CROSS-REFERENCE TO RELATED APPLICATION

This application claims priority to U.S. Provisional Patent Application No. 61/221,147, entitled "Application Aware Bandwidth Control" filed on Jun. 29, 2009, which is assigned to the current assignee hereof and is incorporated herein by reference in it's entirety.

BACKGROUND

Field of the Disclosure

The present disclosure relates to computer networks and more particularly to setting network communication parameters for a computer network.

Description of the Related Art

Communication networks are employed to transfer a wide variety of information between electronic devices. However, as the amount of information transferred over a communication network increases, the communication backbone that governs the network can become stressed, causing undesirable delays in information transfer. This can result in a poor user experience. For example the user can experience network lag, where packets are held at a network node while awaiting transfer to another network node, for an amount of time such that the user is able to perceive the delay in the information transfer. Further, network lag and other network transfer problems can impact a wide variety of applications, such as gaming applications, voice communication applications, and the like.

BRIEF DESCRIPTION OF THE DRAWINGS

The present disclosure may be better understood, and its numerous features and advantages made apparent to those skilled in the art by referencing the accompanying drawings.

DETAILED DESCRIPTION

FIGS. 1-5 illustrate techniques for providing a bandwidth control interface that displays the relative amount of bandwidth assigned to each application executing at a computer device. By displaying the relative amount of bandwidth, the interface allows the user to easily determine how the available bandwidth is allocated among the applications, and whether the allocation provides for efficient network communication. The bandwidth control interface also allows the user to adjust the relative allocation of bandwidth to the executing applications. The user can thereby control the relative amount of bandwidth that is allocated to each application by a network interface device. Thus, for example, the user can allocate more bandwidth to video streaming applications or other applications that may demand the transfer of a large amount of information over a network, resulting in an improved user experience. In one embodiment, the bandwidth control interface can control the bandwidth for applications at multiple computer devices, thereby controlling the relative amount of bandwidth allocated for each application at a router device.

Figure 1:
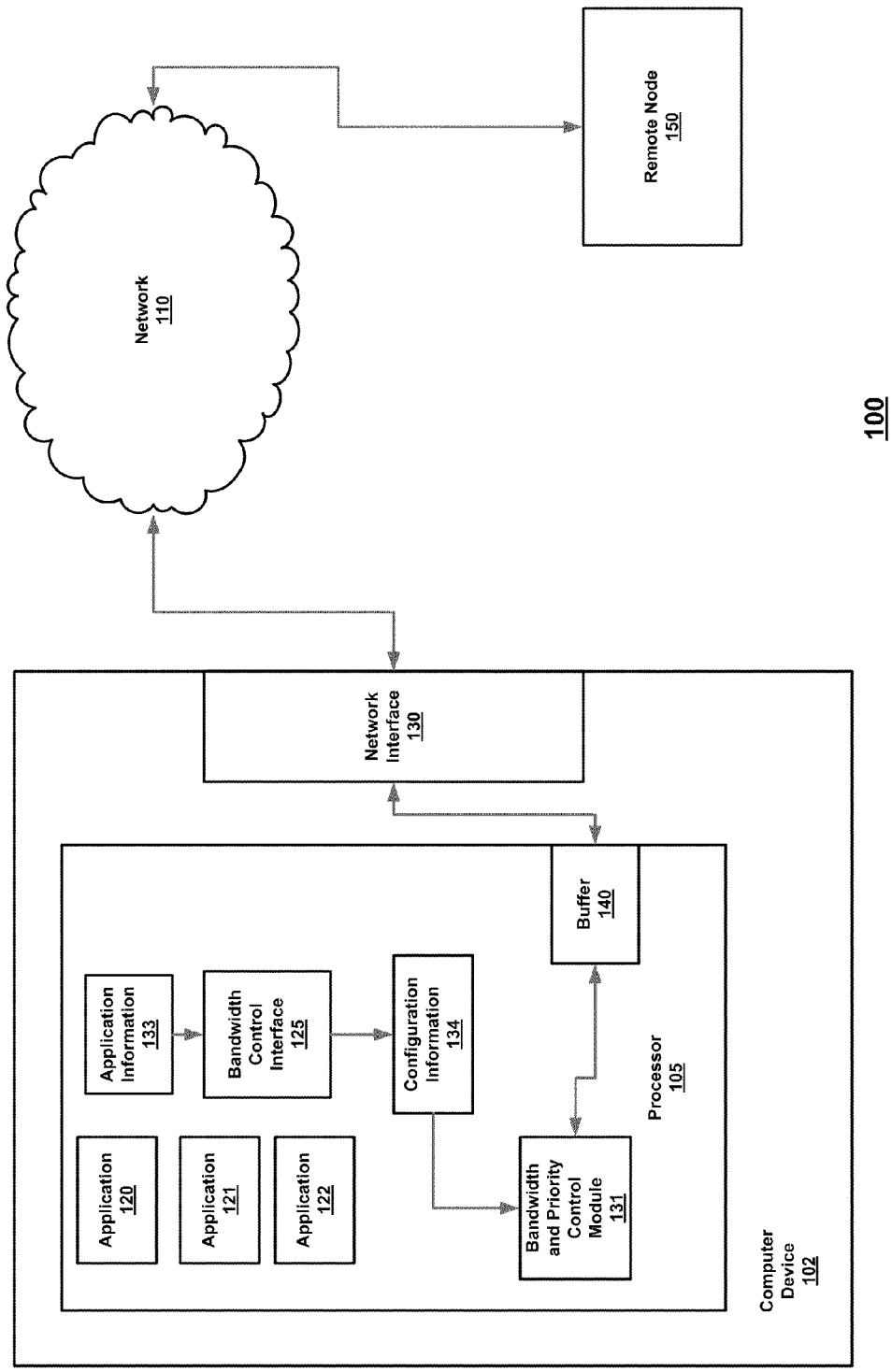
FIG. 1 is a block diagram of a communication system in accordance with one embodiment of the present disclosure.

Referring to FIG. 1, a block diagram of a communication system 100 is illustrated in accordance with one embodiment of the present disclosure. The communication system 100 includes a computer device 102, a network 110, and a remote node 150. The computer device 102 and remote node 150 are each coupled to the network 110. Network 110 provides a physical and logical layer for communication of information between the computer device 102 and remote node 150. Accordingly, the network 110 can be a packet-switched network that is configured to communicate packets between network nodes according to address information included in each packet. The network 110 is thus composed of multiple nodes, with a subset of the nodes having routing devices, such as routers, servers, gateways, and combinations thereof, that are configured to route packets to other nodes according to their associated address information. Packets are thereby routed to a series of nodes until they reach their destination node.

It will be appreciated that network 110 can include one or more sub-networks, and that each sub-network can be a wide area network, such as the Internet, a local area network, and the like. Packets are routed between the sub-networks according to the address information associated with each packet. In addition, it will be appreciated that different sub-networks can use different communication media to transfer information. For example, network 110 can include both wireless and wired networks, and combinations thereof.

Remote node 150 is a network node that is a source and destination for packets to be communicated via the network 110. Accordingly, remote node 150 can be a server in a client-server configuration, a computer device configured in a peer-to-peer network, and the like. Remote node 150 is thus configured to execute one or more applications that provide information to and receive information from the network 110 in order to carry out their designated function.

Computer device 102 is a desktop, laptop, server, handheld computer device, cell phone, or other device that is configured to communicate with remote nodes via the network 110. Accordingly, computer device 102 includes a processor 105 and a network interface 130. The processor 105 is a general purpose or application specific processor device that is configured to execute applications and other programs in order to carry out the programs designated functions. In the illustrated example of FIG. 1, processor 105 executes applications 120, 121, and 122, bandwidth control interface 125, and bandwidth and priority control module 131, each described further below. In addition, the computer device 102 stores application information 133 and configuration information 134, which are used by the bandwidth and priority control module 131 to set the bandwidth and priority assigned to each application executing at the processor 105.

The network interface 130 is a device, such as a network interface card, that provides a physical and logical layer interface for communications from the processor 105 to the network 110. Accordingly, the network interface 130 is configured to receive bytes or other units of information from the applications 120-122, form the information into packets, and communicate the packets to the network 110. In addition, the network interface 130 receives packets from remote nodes via the network 110, extracts information from the data payloads of the packets, and provides the information to the application that is a target of the received packet.

As used herein, the bandwidth assigned to an application refers to the rate at which packets are provided to or received from one or more remote nodes. In particular, the rate at which packets are received from remote nodes is referred to as the download bandwidth, while the rates at which packets are provided to the remote nodes is referred to as the upload bandwidth. The priority associated with an application refers to the order, relative to other applications, in which packets provided by the application or targeted to the application are provided to the network or to the application, respectively. In particular, the upload priority refers to the relative order in which packets provided by the application are communicated to the network 110, while the download priority refers to the relative order in which packets received from the network 110 and targeted to the application are provided to the application.

The network interface 130 can govern the bandwidth and priority for each application in order to ensure that the bandwidth and priority assigned to each application is satisfied. For example, the computer device 102 includes buffer 140 to store bytes of information received from applications to be provided to the network 110 also stores bytes of information received from the network 110 to be provided to the applications executing at processor 105. The network interface 130 can access the buffer 140 to store bytes received from the network 110 and to retrieve bytes of information to be formed into packets for communication to the network 110. The order and rate at which the network interface 130 retrieves packets from the buffer 140 and provides the packets to the network (for upload packets) or application (for download packets) determines the priority and bandwidth for the application. Thus, the network interface 130 can retrieve the packets from the buffer 140 in an order and at a rate to satisfy the bandwidth and priority assigned to each application. This can be better understood with reference to an example, where application 120 is assigned a relatively high bandwidth with respect to applications 121 and 122 and a relatively low priority with respect to applications 121 and 122. Further, application 120 has a higher priority than application 122. Accordingly, the network interface 130 will, for a designated unit of time (referred to as a communication interval), retrieve packets associated with the application 121 from the buffer 140 prior to retrieving packets associated with the application 120, until the bandwidth limit associated with the application 121 is reached. Upon reaching the bandwidth limit for application 121, the network interface 130 stops retrieving packets for application 121 for the designated period of time, and retrieves packets associated with applications 120 until its bandwidth limit is reached. The network interface 130 then retrieves packet associated with application 122 until its bandwidth limit is reached. The network interface 130 then repeats the retrieval process for each application over successive periods of time in order to enforce the priority and bandwidth associated with each application.

The bandwidth control interface 125 provides an interface for controlling the amount of bandwidth allocated to each of the applications 120-122. In particular, the bandwidth control interface 125 is a module configured to determine the applications that are executing at processor 105. For example, the bandwidth control module 125 can determine the applications that are executing by accessing process information, task information, or other information provided by an operating system executing at the processor 105. The bandwidth control interface 125 can also determine what software libraries, device drivers, operating system resources, or other routines, programs, and resources that are being accessed to determine the applications that are executing. The bandwidth control module 125 stores the information that indicates the applications that are executing as application information 133.

In addition, the bandwidth control interface 125 provides an interface, such as a graphical user interface (GUI) that displays the amount of bandwidth allocated to each application, and allows the user to adjust the amount of allocated bandwidth for each application. In particular, in response to the bandwidth control interface 125 being invoked by a user, the interface determines the applications that are executing based on the application information 133. The bandwidth control interface also determines, based on the configuration information 134, the amount of bandwidth allocated to each application. The amount can be based on a predefined or baseline amount of bandwidth, or based on a previously stored bandwidth profile set by the user. The bandwidth control interface 125 displays, via a graphical user interface, the relative amount of bandwidth allocated to each executing application. The graphical display of the relative amount of bandwidth allows the user to easily determine whether the amount of bandwidth allocated to each application provides for efficient communication with the network 110. For example, the user can easily determine if an application that demands a relatively small amount of bandwidth, such as a text chat program, has been assigned the same or more bandwidth as an application that demands a relatively high amount of bandwidth, such as a video streaming program. The user can also easily determine whether the particular bandwidth allocation comports with the user's desired bandwidth profile.

The bandwidth control interface 125 also allows the user, via bandwidth adjustment interfaces, to adjust the amount of bandwidth allocated to each executing application. Based on the user adjustments, the bandwidth control interface 125 stores the amount of bandwidth allocated to each application at configuration information 134.

The bandwidth and priority control module 131 is configured to determine the bandwidth and priority for each application based on the application information 133 and configuration information 134. In particular, the configuration information 134 indicates the amount of bandwidth associated with each application as set by the bandwidth control interface, and also indicates the level of priority to be assigned to each application of a particular type. The bandwidth and priority control module 131 compares the application information 133 with the configuration information 134 and assigns the priorities and bandwidths for each executing application based on the comparison. The bandwidth and priority control module 131 controls access to the buffer 140, as described herein, to regulate the bandwidth and priority for each application according to the allocation set via the bandwidth control interface 125. In particular, the bandwidth and priority control interface 131 regulates the bandwidth for each application by ensuring that, for a designated period of time (such as a communication interval) the amount of information communicated by an executing application to the network 110 does not exceed the percentage of bandwidth allocated to the application. The bandwidth and priority control interface regulates the bandwidth for all executing applications over the designated period of time so that, for the designated period of time, each executing application communicates with the network 110 during the designated period of time without exceeding its amount of allocated bandwidth.

Figure 2:
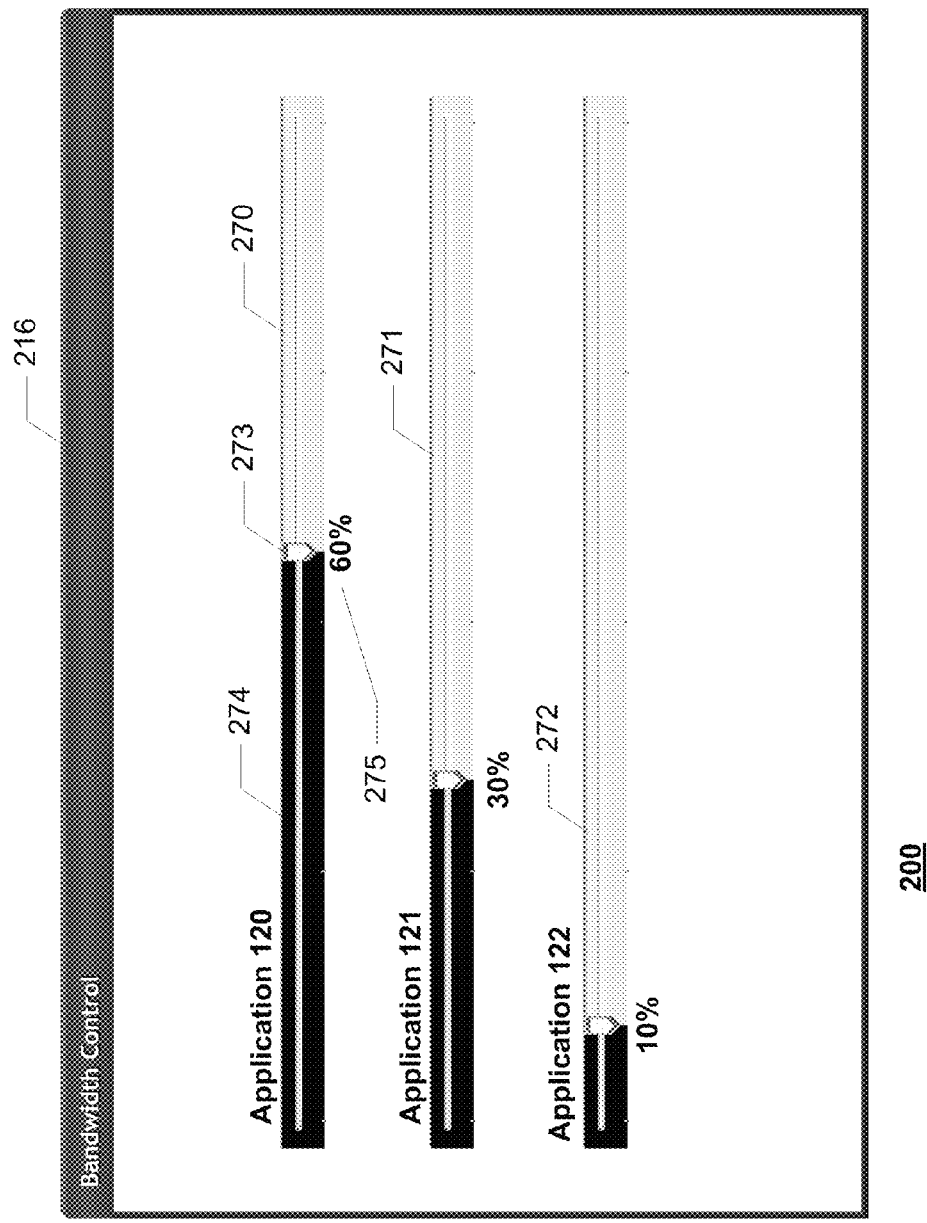
FIG. 2 is a diagram of a display of the bandwidth control interface of FIG. 1 in accordance with another embodiment of the present disclosure.

FIG. 2 illustrates a diagram of a graphical user interface 200 that implements the bandwidth control interface 125 in accordance with one embodiment of the present disclosure. The GUI 200 includes a window 216 that displays slider bars 270, 271, and 272, which are associated with applications 120, 121, and 122, respectively. Each of the slider bars includes an associated slider. For example, slider bar 270 includes a slider 273. Further, each of the slider bars illustrates, via a shaded region of the slider bar, the relative amount of bandwidth allocated to the application associated with the slider bar. Thus, for example, shaded region 274 of slider bar 270 indicates the relative amount of bandwidth allocated to the application 120. In addition, each of the slider bars includes a numerical field that indicates a percentage of the available bandwidth allocated to the application associated with the slider bar. For example, slider bar 270 displays numerical field 275 to indicate that sixty percent of the available bandwidth has been allocated to application 120. As shown in the illustrated example of FIG. 3, the relative amount of bandwidth for each application is displayed simultaneously. The user can thereby easily determine the relative amount of bandwidth allocated to each executing application.

In addition, the user can, via a computer mouse, touch screen, keyboard, or other input device, move a slider along a slider bar to adjust the amount of bandwidth allocated to the application associated with the slider bar. Thus, for example, the user can move the slider 273 to the left to reduce the amount of bandwidth allocated to the application 120, and move the slider bar to the right to increase the amount of bandwidth allocated to the application 120. In response to the adjustment of the slider bar, the bandwidth control module 125 adjusts the amount of bandwidth allocated to the application and stores the adjustment at configuration information 134. The bandwidth and priority control module 131 changes the amount of bandwidth allocated to the application based on the adjustment. In addition, the changes to the amount of bandwidth allocated to each application can be reflected by changes to the slider position and shaded bar associated with each corresponding application. The slider bars thus provide a bandwidth adjustment interface for the corresponding application to allow the user to set the allocated bandwidth for each application.

In response to the user's adjustment of bandwidth allocated to a particular application, the bandwidth control interface 125 can automatically adjust the bandwidth allocated to other executing applications. Thus, if the user reduces the bandwidth allocated to a particular application, the bandwidth control interface 125 can automatically increase the bandwidth allocated to other executing applications. Similarly, if the user increases the bandwidth allocated to a particular application, the bandwidth control interface 125 can increase the bandwidth allocated to the other executing applications. In one embodiment, each of the other executing applications are adjusted by an equal amount. For example, in the illustrated example of FIG. 3, if the user reduces the bandwidth for the application 120 by ten percent, the bandwidth control interface can automatically increase the bandwidth allocated to the applications 121 and 122 by five percent each. In another embodiment, the bandwidth control module adjusts the bandwidth for each of the other executing applications based on a ratio of the amounts of the bandwidth allocated to the other executing applications. For example, in the illustrated embodiment of FIG. 3, application 121 has been allocated 3 times the bandwidth (thirty percent of the available bandwidth) of application 122 (ten percent of the available bandwidth). Accordingly, in response to the user decreasing the amount of bandwidth allocated to application 120 by 12 percent, the bandwidth control module 125 can increase the bandwidth allocated to application 121 proportionally by nine percent, and increase the bandwidth allocated to application 122 proportionally by three percent. Similarly, in response in response to the user increasing the amount of bandwidth allocated to application 120 by 12 percent, the bandwidth control module 125 can reduce the bandwidth allocated to application 121 proportionally by three percent, and decrease the bandwidth allocated to application 122 proportionally by nine percent.

In an embodiment, the bandwidth control module 125 can enforce minimum and maximum limits on the amount of bandwidth allocated to each application. For example, the bandwidth control module 125 can ensure that an application is not allocated less than ten percent of the available bandwidth, and is not allocated more than ninety percent of the available bandwidth.

In addition, the bandwidth control module 125 can detect when a new application is executed or an executing application is halted (for example, closed by the user). In response, the bandwidth control module 125 can automatically adjust the amount of bandwidth allocated to each executing application. For example, in response to an application being halted, the bandwidth control module 125 can automatically increase the amount of bandwidth allocated to the other executing applications in either an equal or proportional fashion, as described above. In response to a new application being executed, the bandwidth control module 125 can automatically allocate a baseline amount of bandwidth to the newly-executed application, and reduce the amount of bandwidth allocated to the other executing applications in either an equal or proportional fashion, as described above. In an embodiment, the baseline amount of bandwidth allocated to a newly executing application can be configured by the user. For example, the bandwidth control module 125 can store the amount of bandwidth allocated to a particular application when the application is halted, and attempt to reallocate the same amount of bandwidth to the application when it subsequently executed. Further, in an embodiment, the bandwidth control module 125 can store profiles of sets of executing applications indicating the relative amount of bandwidth allocated to each, and automatically allocate the indicated amount of bandwidth to each corresponding application when each application in the set is executed. The profiles can be based on bandwidth allocation settings set by the user via the GUI 200.

In an embodiment, each executing application can include multiple application instances. For example, a web browser application can include multiple instances, with each instance associated with a different browser window or browser tab. The bandwidth control module 125 can allocate an amount of bandwidth for each application instance based on the bandwidth allocated for the application via the GUI 200. Thus, for the illustrated example of FIG. 3, if there are three executing instances of application 120, the bandwidth control module 125 can allocate twenty percent of the available bandwidth to each of the instances. In another embodiment, the bandwidth allocated to each instance can be controlled individually via GUI 200.

Figure 3:
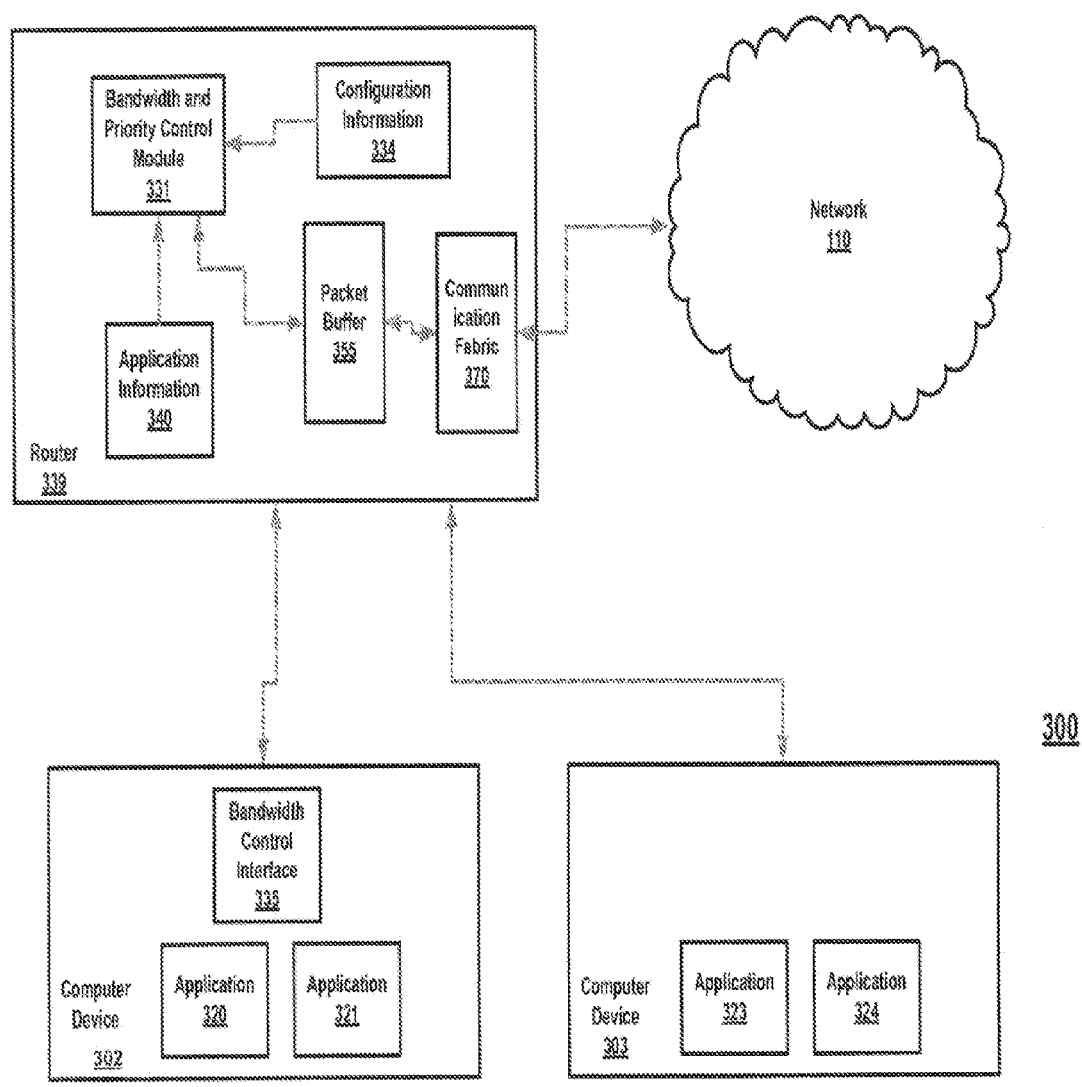
FIG. 3 is a block diagram of a communication system in accordance with one embodiment of the present disclosure.

Referring to FIG. 3, a block diagram of a communication network 300 in accordance with one embodiment of the present disclosure. Communication network 300 includes the network 110, computer devices 302 and 303, and a router 339. The router 339 is connected to both of the computer devices 302 and 303 and the network 110. Each of the computer devices 302 and 303 is configured similarly to the computer device 102 of FIG. 1, in that each executes applications that communicate with remote nodes (not shown) via the network 110. Thus, for example, computer device 302 executes applications 320 and 321, while computer device 303 executes applications 323 and 324. The computer device 302 also includes a bandwidth control interface 335 as a GUI that provides an interface to control allocation of bandwidth at router 339 both for applications executing at computer device 302 and for applications executing at computer device 303.

To illustrate, the router 339 is a device configured to receive packets and route each packet to other nodes based on address information indicated by the packet. In the illustrated embodiment, the router 339 provides an interface between the network 110 and the computer devices 302 and 303. In particular, the router 339 routes packets received from the computer devices 302 and 303 to destination remote nodes via the network 110 and also routes packets received from the network 110 to one or both of the computer devices 302 and 303, based on address information associated with each corresponding received packet.

The router 339 includes a bandwidth and priority control module 331, configuration information 334, and application information 340, each configured similarly to the corresponding modules of FIG. 1. Further, the router 339 includes a packet buffer 355 and a communication fabric 370. The communication fabric 370 provides a physical interface, such as a switching fabric, that allows the router 339 to route received packets to the appropriate destination. The packet buffer 355 stores received packets, including packets received from either of the computer devices 302 and 303 and the network 110. The bandwidth and priority control module 331 provides packets from the buffer 355 to the communication fabric 370 for routing based on the bandwidth and priority associated with each application executing at the computer devices 302 and 303. The router 339 thereby provides for controlling the bandwidth and priority of packet communication based on application type, in similar fashion to the network interface 130 of FIG. 1. However, the router 339 is able to assign the bandwidth and priority for both of the computer devices 302 and 303. Thus, for example, application 320 can be assigned more bandwidth and a higher priority at router 339, based on its application type, than is assigned to application 323, based on its application type. Further, the bandwidth allocated to each of the applications 320-324 can be set via bandwidth control interface 335 executing at computer device 302. Thus, bandwidth control interface 335 can display the amount of bandwidth allocated to each application, both for applications executing at the same computer device and at computers located remotely. Further, the bandwidth control interface 335 provides an interface for the user to control allocation of the bandwidth both for locally and remotely executing applications. Thus a user, such as a network administrator, can review the bandwidth allocated to applications at multiple computer devices coupled to the same router or network, and to adjust the amount of bandwidth allocated to each application to match a desired profile.

In an embodiment, the bandwidth control interface 335 includes a security module that, prior to allowing the user to display and control the bandwidth for remotely executing applications, requests authentication information, such as a password or security code, from the user. The bandwidth control interface 335 authenticates the authentication information, and if the information is authenticated, allows the user access to the interface to review and allocate bandwidth for applications executing at computer device 303. If the information is not authenticated, the bandwidth control interface 335 can prevent the user from viewing and allocating bandwidth for any applications, including those executing at computer device 302, or allow the user to authenticate only those applications that are executed locally at computer device 302.

Figure 4:
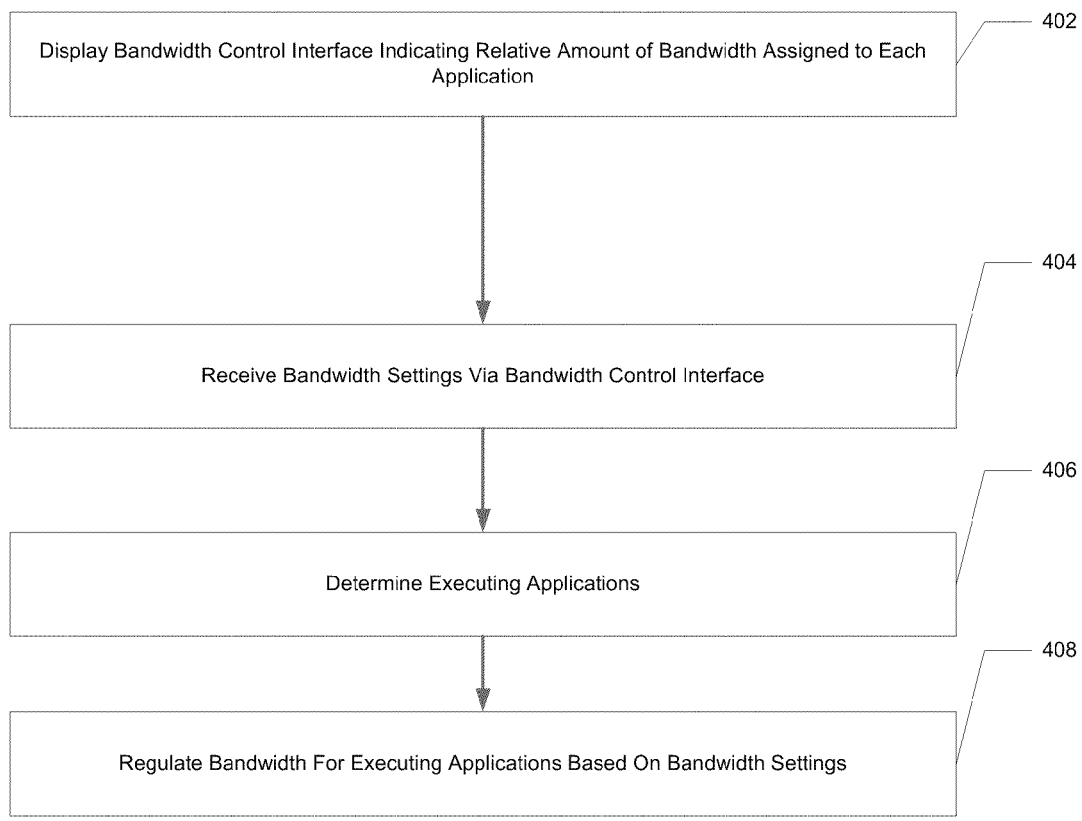
FIG. 4 is a flow diagram of a method of communicating packets to a network in accordance with one embodiment of the present disclosure.

FIG. 4 illustrates a flow diagram of a method of allocating the bandwidth for a set of executing applications in accordance with one embodiment of the present disclosure. At block 402, a computer device displays a GUI for a bandwidth control interface. At block 404, the computer device receives bandwidth allocation settings for a set of applications executing at the same computer device, one or more remote computer devices, or both. The computer devices that execute the set of applications are referred to as the set of computer devices. At block 406, a network interface device, such as a router or network interface card, determines the set of applications being executed at the set of computer devices. At block 408, the network interface device regulates the bandwidth based on the bandwidth allocation settings so that each application in the set of applications does not exceed its corresponding amount of allocated bandwidth.

Figure 5:
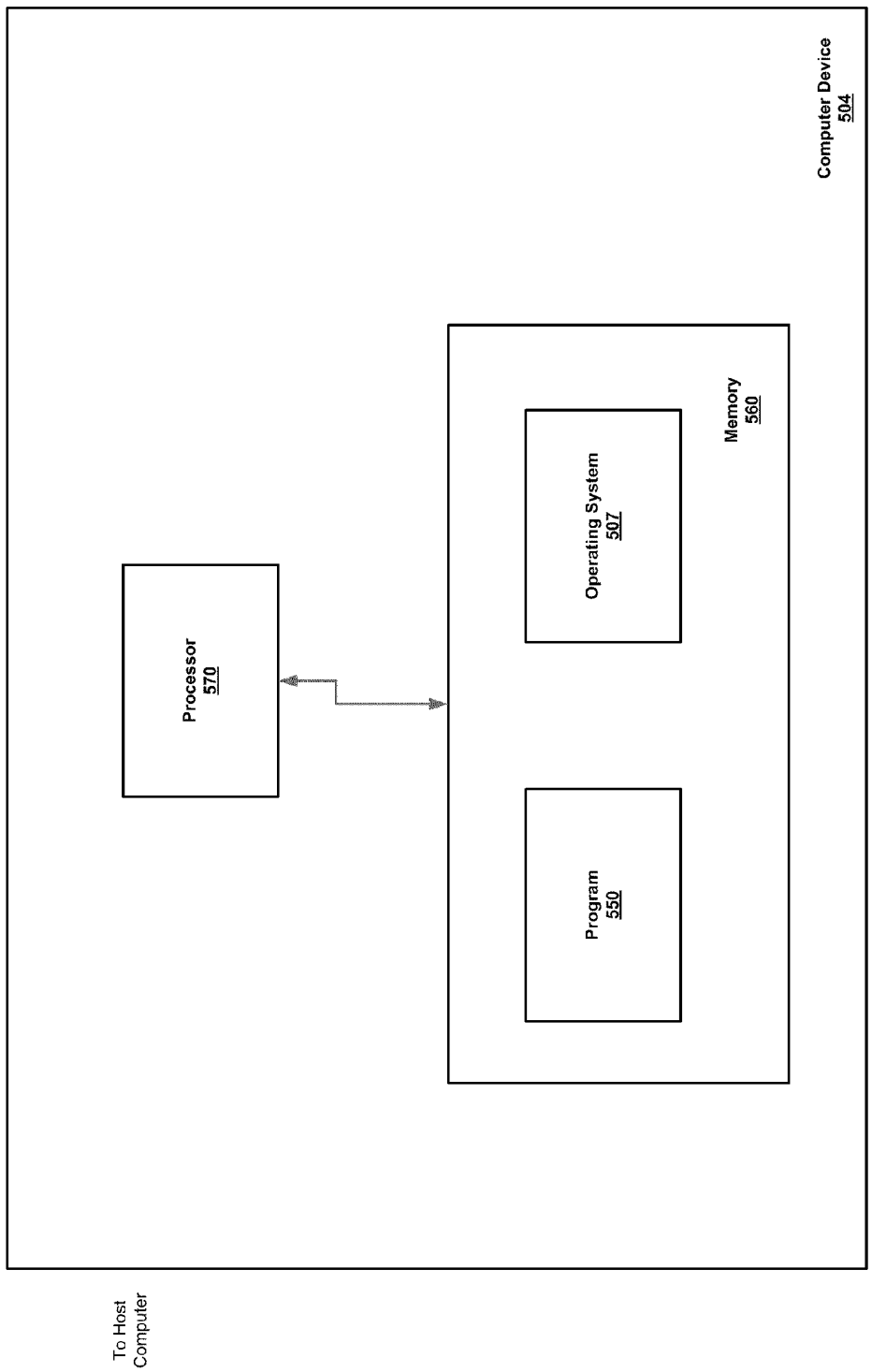
FIG. 5 is a block diagram of a computer device in accordance with one embodiment of the present disclosure.

Referring to FIG. 5, a block diagram of a particular embodiment of a computer device 504 is illustrated. The computer device 504 includes a processor 570 and a memory 560. The memory 560 is accessible to the processor 570. The processor 570 can be a microprocessor, microcontroller, and the like. The memory 560 is a computer readable medium that can be volatile memory, such as random access memory (RAM), or non-volatile memory, such as a hard disk or flash memory.

The memory 560 stores a program 550 and an operating system 507. The program 550 and the operating system 507 include instructions to manipulate the processor 570 in order to implement one or more of the methods described herein. Other programs, such as applications, can also be stored in the memory 560 to manipulate the processor in order to implement the described methods.

The above disclosed subject matter is to be considered illustrative, and not restrictive, and the appended claims are intended to cover all such modifications, enhancements, and other embodiments that fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method for communicating via a network interface of a computer device, the method comprising:
simultaneously displaying on a graphical user interface a plurality of bandwidth adjustment slider interfaces, wherein each of the plurality of bandwidth adjustment slider interfaces includes a numerical field that indicates an associated percentage of an available bandwidth between the network interface of the computer device and a network, wherein the plurality of bandwidth adjustment slider interfaces include a first bandwidth adjustment slider interface and a second bandwidth adjustment slider interface;
receiving, via the first bandwidth adjustment slider interface at the computer device, a first user input indicating a first relative amount of bandwidth allocated to a first application executing at the computer device;

receiving, via the second bandwidth adjustment slider interface at the computer device, a second user input indicating a second relative amount of bandwidth allocated to a second application executing at the computer device, wherein the first relative amount of bandwidth and the second relative amount of bandwidth are associated with percentages of the available bandwidth, and wherein the second bandwidth adjustment slider interface is responsive, at least in part, to changes at the first bandwidth adjustment slider interface; and regulating communication via the network interface of the computer device based, at least in part, on the first relative amount of bandwidth allocated to the first application and the second relative amount of bandwidth allocated to the second application.

2. The method of claim 1, further comprising:
receiving a first bandwidth setting via the first bandwidth adjustment slider interface and a second bandwidth setting via the second bandwidth adjustment slider interface; and
determining a first adjustment to the first relative amount of bandwidth based, at least in part, on the first bandwidth setting and a second adjustment to the second relative amount of bandwidth based, at least in part, on the second bandwidth setting.

3. The method of claim 1, wherein the first relative amount of bandwidth is associated with a first percentage of the available bandwidth, and wherein regulating communication via the network interface comprises regulating an amount of information communicated between the first application and the network to no more than the first percentage of the available bandwidth.

4. The method of claim 1, wherein the first application comprises a first application instance and a second application instance, and wherein regulating communication via the network interface comprises regulating an amount of information communicated by the first application instance and the second application instance to be no more than a first percentage of the available bandwidth.

5. The method of claim 1, further comprising:
determining that the second application is no longer being executed by the computer device; and
in response to said determining, automatically adjusting the first relative amount of bandwidth.

6. The method of claim 1, further comprising:
determining initiation of a third application being executed by the computer device; and
in response to said determining, automatically adjusting the first relative amount of bandwidth and the second relative amount of bandwidth.

7. The method of claim 6, wherein automatically adjusting the first relative amount of bandwidth and the second relative amount of bandwidth comprises adjusting the first relative amount of bandwidth based, at least in part, on a ratio between the first relative amount of bandwidth and the second relative amount of bandwidth.

8. The method of claim 1, wherein the first bandwidth adjustment slider interface and the second bandwidth adjustment slider interface are part of a bandwidth control interface that also allows user allocation of bandwidth for a plurality of executing applications at the computer device.

9. The method of claim 1, wherein regulating communication via the network interface comprises:

setting a first limit at the network interface of the computer device based, at least in part, on the first relative amount of bandwidth allocated to the first application; and
setting a second limit at the network interface of the computer device based, at least in part, on the second relative amount of bandwidth allocated to the second application.

10. The method of claim 9, wherein setting the first relative amount of bandwidth comprises setting a bandwidth allocation at the network interface.

11. The method of claim 1, wherein the first application and the second application share the available bandwidth between the computer device and the network via the network interface of the computer device.

12. The method of claim 1, wherein said regulating communication via the network interface comprises setting a packet rate limit for the first application executing at the computer device.

13. The method of claim 1, wherein said regulating communication via the network interface comprises buffering packets for the first application at a buffer associated with the network interface and retrieving packets from the buffer at a rate determined by the first relative amount of bandwidth.

14. The method of claim 1, further comprising:
detecting, at the computer device, when a new application is executed on the computer device or when an existing application executing on the computer device is halted;
automatically adjusting the relative amounts of bandwidth allocated to each of the plurality of applications in response to said detecting; and
regulating communication via the network interface of the computer device based, at least in part, on the adjusted relative amounts of bandwidth.

15. The method of claim 14, wherein said automatically adjusting the relative amounts of bandwidth includes adjusting the relative amounts of bandwidth allocated to each of the plurality of applications in a proportional adjustment based, at least in part, on a previous relative amount of bandwidth allocated to each of the plurality of applications.

16. A non-transitory computer readable storage medium storing a program of instructions to manipulate a processor, the program of instructions comprising instructions to:
at a computer device:
simultaneously display on a graphical user interface a plurality of bandwidth adjustment slider interfaces, wherein each of the plurality of bandwidth adjustment slider interfaces includes a numerical field that indicates an associated percentage of an available bandwidth between a network interface of the computer device and a network, wherein the plurality of bandwidth adjustment slider interfaces include a first bandwidth adjustment slider interface and a second bandwidth adjustment slider interface;
receive, via the first bandwidth adjustment slider interface, a first relative amount of bandwidth allocated to a first application executable at the computer device,
receive, via the second bandwidth adjustment slider interface, a second relative amount of bandwidth allocated to a second application executable at the computer device,
wherein the first relative amount of bandwidth and the second relative amount of bandwidth are displayed as percentages of the available bandwidth, and wherein the second bandwidth adjustment slider interface is responsive, at least in part, to changes at the first bandwidth adjustment slider interface; and regulate communication via the network interface of the computer device based, at least in part, on the first relative amount of bandwidth allocated to the first application and based, at least in part, on the second relative amount of bandwidth allocated to the second application.

17. The non-transitory computer readable storage medium of claim 16 wherein the program of instructions further comprises instructions to:
receive a first bandwidth setting via the first bandwidth adjustment slider interface and a second bandwidth setting via the second bandwidth adjustment slider interface; and
determine a first adjustment to the first relative amount of bandwidth based, at least in part, on the first bandwidth setting and a second adjustment to the second relative amount of bandwidth based, at least in part, on the second bandwidth setting.

18. The non-transitory computer readable storage medium of claim 16, wherein each of the first bandwidth adjustment slider interface and the second bandwidth adjustment slider interface comprises a slider interface.

19. The non-transitory computer readable storage medium of claim 16, wherein the first relative amount of bandwidth is associated with a first percentage of the available bandwidth, and wherein the program of instructions to regulate communications of the first application comprise instructions to regulate an amount of information communicated between the first application and the network to no more than the first percentage of the available bandwidth.

20. The non-transitory computer readable storage medium of claim 16, wherein the first application comprises a first application instance and a second application instance, and wherein the program of instructions to regulate the communication of the first application comprise instructions to regulate an amount of information communicated by the first application instance and the second application instance to be no more than a first percentage of the available bandwidth.

21. The non-transitory computer readable storage medium of claim 16, wherein the program of instructions further comprise instructions to:
determine that the second application is no longer being executed by the computer device; and
in response to determining that the second application is no longer being executed, automatically adjust the first relative amount of bandwidth.

22. The non-transitory computer readable storage medium of claim 16, wherein the program of instructions further comprise instructions to:
determine an initiation of a third application to be executed by the computer device; and
in response to determining the initiation of the third application, automatically adjust the first relative amount of bandwidth and the second relative amount of bandwidth.

23. A computer device comprising:
a network interface configured to couple the computer device to a network; and
a bandwidth control interface configured to:
simultaneously display on a graphical user interface a plurality of bandwidth adjustment slider interfaces associated with allocating relative amounts of bandwidth to each of a plurality of applications executable at the computer device, the relative amounts of bandwidth associated with percentages of an available bandwidth between the network interface and the network, wherein each of the plurality of bandwidth adjustment slider interfaces includes a numerical field that indicates an associated percentage of the available bandwidth, wherein the plurality of bandwidth adjustment slider interfaces include a first bandwidth adjustment slider interface and a second bandwidth adjustment slider interface;
receive, via the first bandwidth adjustment slider interface, a first user input indicating a first relative amount of bandwidth allocated to a first application executing at the computer device;
receive, via the second bandwidth adjustment slider interface, a second user input indicating a second relative amount of bandwidth allocated to a second application executing at the computer device, wherein the second bandwidth adjustment slider interface is responsive, at least in part, to changes at the first bandwidth adjustment slider interface; and
regulate, for each of the plurality of applications, communication with the network via the network interface based, at least in part, on the relative amounts of bandwidth allocated by the plurality of bandwidth adjustment slider interfaces.

24. The computer device of claim 23, wherein the bandwidth control interface is configured to enable a user to review and allocate bandwidth between the network interface and the network based, at least in part, on communication from applications executable at a remote computer device.

25. The computer device of claim 24, wherein the bandwidth control interface includes a security module configured to authenticate the user.

26. The computer device of claim 23, wherein the bandwidth control interface is configured to determine the relative amounts of bandwidth previously allocated to each of the plurality of applications based, at least in part, on configuration information associated with the network interface.

27. The computer device of claim 23, wherein the bandwidth control interface is configured to maintain one or more bandwidth profiles for sets of executable applications, the one or more bandwidth profiles associated with a particular user of the computer device.

28. A system for communicating via a network interface of a computer device, the system comprising:
means for simultaneously displaying on a graphical user interface a plurality of bandwidth adjustment slider interfaces, wherein each of the plurality of bandwidth adjustment slider interfaces includes a numerical field that indicates an associated percentage of an available bandwidth between the network interface of the computer device and a network, wherein the plurality of bandwidth adjustment slider interfaces include a first bandwidth adjustment slider interface and a second bandwidth adjustment slider interface;
means for receiving, via the first bandwidth adjustment slider interface at the computer device, a first user input indicating a first relative amount of bandwidth allocated to a first application executing at the computer device;
means for receiving, via the second bandwidth adjustment slider interface at the computer device, a second user input indicating a second relative amount of bandwidth allocated to a second application executing at the computer device, wherein the first relative amount of bandwidth and the second relative amount of bandwidth are associated with percentages of the available bandwidth, and wherein the second bandwidth adjustment slider interface is responsive, at least in part, to changes at the first bandwidth adjustment slider interface; and means for regulating communication via the network interface of the computer device based, at least in part, on the first relative amount of bandwidth allocated to the first application and the second relative amount of bandwidth allocated to the second application.

29. The system of claim 28, further comprising:

means for receiving a first bandwidth setting via the first bandwidth adjustment slider interface and a second bandwidth setting via the second bandwidth adjustment slider interface; and means for determining a first adjustment to the first relative amount of bandwidth based, at least in part, on the first bandwidth setting and a second adjustment to the second relative amount of bandwidth based, at least in part, on the second bandwidth setting.

30. The system of claim 28, wherein the first relative amount of bandwidth is associated with a first percentage of the available bandwidth, and wherein the means for regulating communication via the network interface comprises means for regulating an amount of information communicated between the first application and the network to no more than the first percentage of the available bandwidth.

31. The system of claim 28, further comprising:

means for determining that the second application is no longer being executed by the computer device; and means for automatically adjusting the first relative amount of bandwidth in response to said means for determining that the second application is no longer being executed by the computer device.

32. The system of claim 28, further comprising:

means for determining initiation of a third application being executed by the computer device; and means for automatically adjusting the first relative amount of bandwidth and the second relative amount of bandwidth in response to said means for determining initiation of the third application being executed by the computer device.

* * * * *